(12) United States Patent
Jurk

(10) Patent No.: US 8,452,480 B2
(45) Date of Patent: May 28, 2013

(54) METHOD FOR AUTHORIZING EXTERNAL DEVICES

(75) Inventor: Reinhard Jurk, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 390 days.

(21) Appl. No.: 11/853,340

(22) Filed: Sep. 11, 2007

(65) Prior Publication Data

US 2008/0065272 A1    Mar. 13, 2008

Related U.S. Application Data

(63) Continuation of application No. PCT/EP2006/000981, filed on Feb. 4, 2006.

(30) Foreign Application Priority Data

Mar. 12, 2005    (DE) .......................... 10 2005 011 487

(51) Int. Cl.
*G01M 17/00*    (2006.01)

(52) U.S. Cl.
USPC .................. 701/29.6; 701/29.1; 701/32.6

(58) Field of Classification Search
USPC ................................ 701/29, 32, 33
See application file for complete search history.

(56) References Cited

U.S. PATENT DOCUMENTS

| | | | | |
|---|---|---|---|---|
| 5,787,367 | A * | 7/1998 | Berra | 701/1 |
| 6,256,557 | B1 * | 7/2001 | Avila et al. | 701/1 |
| 7,227,455 | B2 * | 6/2007 | Waszkowski | 340/441 |
| 2002/0152398 | A1 | 10/2002 | Krumrein | |
| 2004/0083374 | A1 * | 4/2004 | Sugawara | 713/189 |
| 2005/0024255 | A1 | 2/2005 | Chuey | |
| 2005/0068191 | A1 | 3/2005 | Eschke et al. | |

FOREIGN PATENT DOCUMENTS

| | | |
|---|---|---|
| DE | 101 12 699 A1 | 10/2002 |
| DE | 101 44 780 A1 | 4/2003 |
| EP | 1 241 061 B1 | 9/2002 |

OTHER PUBLICATIONS

International Search Report dated May 26, 2006 with English Translation (Four (4) pages).
German Search Report dated Nov. 25, 2005 with English Translation of relevant portion (Nine (9) pages).

* cited by examiner

*Primary Examiner* — Helal A Algahaim
(74) *Attorney, Agent, or Firm* — Crowell & Moring LLP

(57) ABSTRACT

A method of authorizing external devices that can be optionally connected with a data bus of a motor vehicle is provided. At least a first code can be entered by an operator in an external device that can be connected with the data bus, and is sent by the external device by way of the data bus to an authorization device of the motor vehicle. The first code is compared with a second code by the authorization device and, if the first code corresponds to the second code, the device connected with the data bus is authorized for coupling to the data bus. The second code is defined on the motor vehicle side independently of the external device. The second code, or a replacement code suitable for its determination, is emitted by an output unit in the motor vehicle interior.

13 Claims, 1 Drawing Sheet

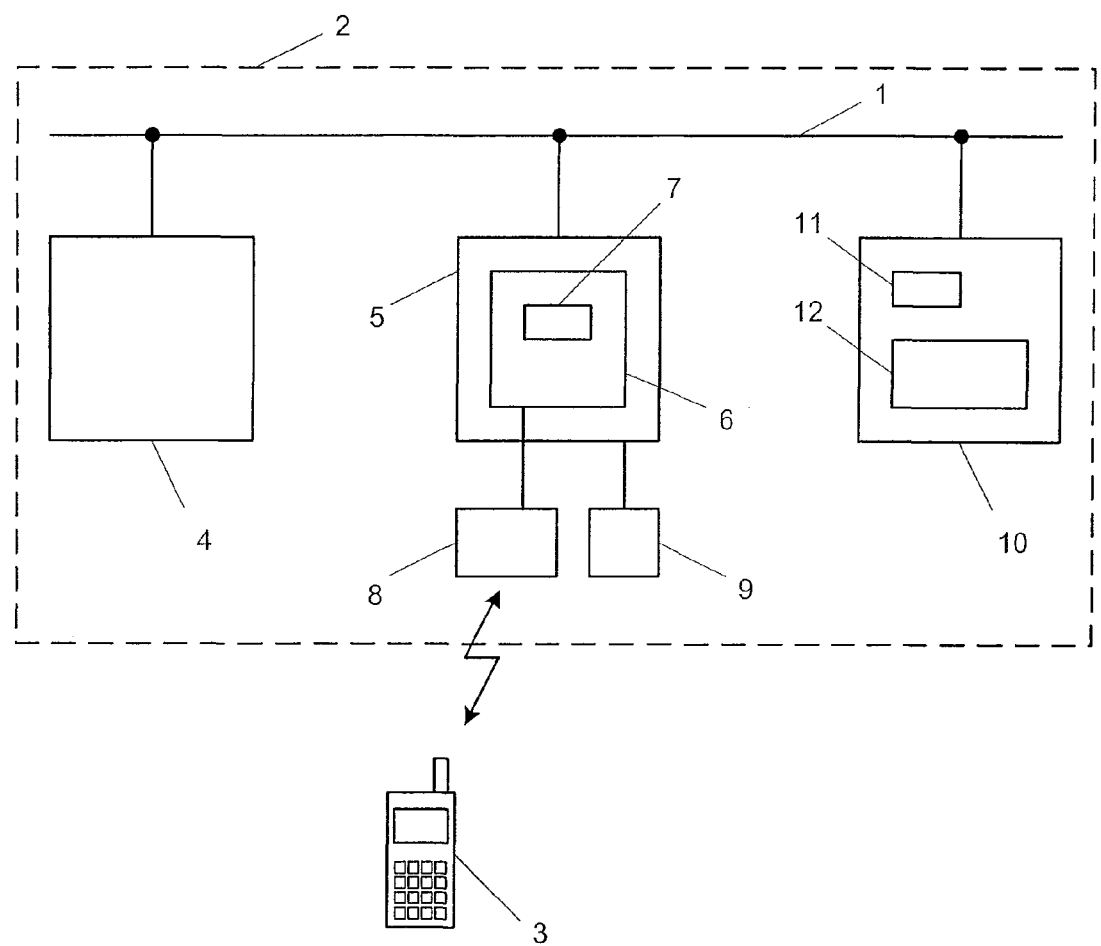

METHOD FOR AUTHORIZING EXTERNAL DEVICES

CROSS-REFERENCE TO RELATED APPLICATIONS

This application is a continuation of PCT International Application No. PCT/EP2006/000981, filed on Feb. 4, 2006, which claims priority under 35 U.S.C. §119 to German Application No. 10 2005 011 487.3, filed Mar. 12, 2005, the entire disclosures of which are expressly incorporated by reference herein.

BACKGROUND AND SUMMARY OF THE INVENTION

The invention relates to a method of authorizing external devices that can be optionally connected to a data bus of a motor vehicle. Via the method, at least a first code can be entered by an operator in an external device that can be connected with the data bus and is forwarded by this device to an authorization device of the motor vehicle via the data bus. The first code is compared with a second code by the authorization device and, if the first code corresponds to the second code, the device connected with the data bus is authorized to couple to the data bus.

New technologies and application scenarios in the automotive field often contain the coupling of external devices to a data bus of a motor vehicle. A common example is the coupling of a mobile telephone to a motor vehicle radio system.

By using modern network technologies (such as Bluetooth, WLAN), such a coupling of external devices can not only take place in a wire-line but also in a wireless manner.

In many cases, the range of such a wireless connection, in principle, also permits the coupling-on of external devices situated outside the motor vehicle. Therefore, in order to prevent an unauthorized and/or erroneous coupling of external devices, particularly in the case of the initial or first-time wireless coupling of an external device to a data bus suitable for the wireless coupling-on of external devices, the authorization of the external device for the coupling to the data bus has to be checked.

Methods for such an authorization are known, by which an external device, which can be connected with the data bus, is connected with the data bus and, by way of the data bus, sends a first code to an authorization device of the motor vehicle. The first code is compared with a second code by the authorization device. If the first code corresponds to the second code, the device connected with the data bus is authorized to be coupled to the data bus. In connection with the Bluetooth network technology, such an authorization method is usually called "pairing".

In the context of this application, connecting an external device to a data bus means the establishment of a wire-line or wireless connection with at least one user of the data bus. The feasibility of a data communication between the external device and at least one user of the data bus for the purpose of implementing a certain functionality is not necessarily ensured by such a connection. Only a coupling of an external device to the data bus, in the context of this application, allows the carrying-out of a data communication between the external device and at least one user of the data bus for the purpose of the implementation of a certain functionality.

In the case of an authorization method of the above-described type, the first code typically has to be entered by the operator into the external device, which can be connected with the data bus. The input can take place, for example, by the selection of a certain menu item in the operating structure of the external device and a subsequent typing of the code on a keyboard of the external device.

The operator typically enters the second code into the motor-vehicle-side authorization device itself or into an input device of the motor vehicle assigned to the authorization device at least for this purpose. As a rule, also for carrying out such an input, the selection of a certain menu item in an operating structure and a subsequent typing of the code on a keyboard (or by way of a rotary button) is required.

Such a method has the disadvantage that the two codes have to be entered by the operator in two types of respectively high-expenditure and error-susceptible input processes. It is a particular disadvantage that the two input processes relate to two different devices—on the one hand, to the external device and, on the other hand, to the authorization device or an input device assigned to the latter.

As an alternative, it is known to fixedly store one of the two codes, particularly the second code, in the respective device. The operator can then typically find the respective code in written documentation, which is assigned to the respective device, and then has to only enter the code in the respective other device. Here, it is disadvantageous that the operator frequently does not immediately have access to the written documentation in the interior of the vehicle which, because of the code, are subject to certain secrecy requirements. In addition, the need to look-up information in written documents may be very time-consuming and/or is considered awkward by many operators. In the least favorable case, the written documents containing the code may even be lost.

The present invention provides a simple method of authorizing external devices, which requires the operator to enter only one code and does not call for any written recording of a code.

According to the invention, a method is provided for authorizing external devices that can be optionally connected with a data bus of a motor vehicle. At least a first code can be entered by an operator in an external device that can be connected with the data bus and is sent by this device, by way of the data bus, to an authorization device of the motor vehicle. The first code is compared with a second code by the authorization device and, if the first code corresponds to the second code, the device connected with the data bus is authorized to couple to the data bus. The second code is defined on the motor vehicle side independently of the external device. The second code is emitted by an output unit in the motor vehicle interior. Preferably, the second code is defined by the authorization device itself.

The method according to the invention has the advantage that the operator has to receive the second code defined on the motor vehicle side according to the invention only from the output unit by reading this second code, for example, from a graphic display unit and entering this second code as the first code in an external device to be authorized. The authorization of the external device will then require only a single input process to be carried out by the operator.

The invention is based on the consideration that although, in the case of a method of the above-mentioned type, the first code and the second code have to correspond to one another for a successful authorization of an external device, from a technical point of view, the common code in principle may be selected in any manner.

According to the invention, the second code is defined on the motor vehicle side at first independently of any external device. For a successful authorization of an external device to be authorized, only the same code then has to be entered into this device as the first code.

Since, as a rule, an operator in the vehicle interior is not expected to improperly couple an external device, the second code defined on the motor vehicle side can be made accessible to any vehicle occupant without any risk. According to the invention, the second code or a replacement code suitable for its determination is therefore emitted by an output unit in the motor vehicle interior.

A replacement code suitable for the determination of the second code is a code which is not identical with the second code but from which, possibly utilizing a corresponding prior knowledge, the second code can easily be derived by the operator. For example, for the determination of a four-digit second code, a replacement code having more than four digits, such as a six-digit replacement code, may be emitted to the operator. The operator can then derive the second code by using the prior knowledge that four selected digits of the replacement code form the second code.

For the correct detection of the second code and/or for its derivation from a replacement code and/or for triggering a corresponding output of an output unit, the operator's prior knowledge may be required. Providing such a prior knowledge to the operator may require a written recording of corresponding information, for example, in operating instructions. However, such a prior knowledge is much more easily remembered by most operators than a specific code itself, which is why a one-time recording of corresponding information is sufficient for most operators for having the corresponding prior knowledge in the target situation. In addition, such information is not vehicle-specific; in contrast to a code, it requires no secrecy and can easily be learned, for example, from the dealer or at a service facility.

The information as to how the second code defined on the motor vehicle side or a replacement code suitable for determining the second code can be fetched (or how the first code required for a successful authorization is obtained from the emitted replacement code) may possibly be added to a prompt of an external device emitted within the scope of the authorization process according to the invention for the input of a first code (or may be indicated by the prompt).

According to a preferred embodiment of the present invention, the second code is defined in a time-variable manner on the motor vehicle side. This, for example, has the additional advantage that attempts to spy on the code by unauthorized persons is made more difficult. Within the context of the present invention, a condition-dependent and/or situation-dependent defining is also considered to be a time-variable definition.

According to various embodiments of the invention, it may be necessary for the operator to carry out one or more operating actions in order to trigger an output of the second code by the output unit. It may, for example, be required to adjust an onboard computer to a certain display mode or to call up a certain menu item in the operating structure of a menu-based multifunctional operating system.

For the motor-vehicle-side defining of the second code, different methods are contemplated. For example, the second code may be determined from an operating quantity stored in the motor vehicle. In most cases, such a definition automatically necessitates a time variability of the second code.

The advantage of such an embodiment of a method according to the invention is that many operating quantities of the motor vehicle are stored in the motor vehicle anyhow and/or can be determined in a simple manner. In this case, it is advantageous that no special storage unit for storing the second code and/or no special devices and/or process steps for determining the second code have to be provided for the practical implementation of the invention. However, depending on the embodiment of the invention, a storage unit for storing the second code can deliberately be provided also without any absolute necessity.

In the case of a second code which is defined in a time-variable manner and is stored in a storage unit, the content of such a storage unit should be correspondingly updated in a time-controlled or event-controlled fashion.

According to a particularly advantageous embodiment of the invention, an operating quantity of the motor vehicle is used for determining the second code, which operating quantity can be emitted by an output unit of the motor vehicle for at least one additional purpose, particularly a purpose which is independent of the authorization of external devices. In the case of such an embodiment, the practical implementation of the invention can be carried out at particularly low expenditures because neither an output unit specific to the invention, nor a possibility for the output of the second code or of a replacement code has to be created which is specific to the invention.

According to preferred embodiments of the invention, the second code defined on the motor vehicle side or a replacement code suitable for its determination is made accessible to the operator in a manner that is as comfortable as possible. According to a particularly preferred embodiment of the invention, the second code or a corresponding replacement code is emitted by an output unit in the motor vehicle interior without the necessity of an operating action by the operator.

In particular, it is contemplated that the second code is determined by the authorization device from the mileage of the motor vehicle. The mileage, which, at least during the operation of the motor vehicle, typically is within the operator's field of view, is then used by the operator for determining the second code. No operating action by the operator is required for its output.

Other objects, advantages and novel features of the present invention will become apparent from the following detailed description of the invention when considered in conjunction with the accompanying drawings.

BRIEF DESCRIPTION OF THE DRAWING

The drawing is a schematic block diagram view of a system suitable for the implementation of the method according to the invention.

DETAILED DESCRIPTION OF THE DRAWING

The external device 3 (here, a mobile telephone), that can be optionally connected with a data bus 1 of a motor vehicle 2, is to be connected with the data bus 1 and authorized for data communication with at least one user of the data bus 1 for the purpose of the implementation of a certain functionality.

In the present embodiment, as a result of the coupling, the partial functionalities of a handsfree functionality for the mobile telephone 3 are to be implemented. For this purpose, the mobile telephone has to be permitted to carry out the data communication with various users of the data bus 1.

An audio system 4 and a handsfree device 5 are connected to the data bus 1, which handsfree device 5 contains a coupling module 6 with an integrated code memory 7. The coupling module 6 is connected with an antenna 8 for data communication between the coupling module and optionally connectable external devices. A microphone 9 is also connected to the handsfree device 5.

Furthermore, an instrument combination 10 is connected to the data bus, which instrument combination 10 contains a storage unit 11 in which the mileage of the motor vehicle 2 is stored. In addition, the instrument combination 10 contains a display unit 12 on which the mileage of the motor vehicle 2 is permanently displayed at least during the driving operation of the motor vehicle 2.

For the implementation of different partial functionalities of a handsfree functionality, the handsfree device 5 permits several variants of a data communication between an authorized external device and the handsfree device 5, or between an authorized external device and another user of the data bus 1. For example, the handsfree device 5 is suitable for providing data communication between an authorized external device and the audio system 4 by way of the data bus 1. Furthermore, the handsfree device 5 is suitable for providing operation of selected functions of an authorized external device by way of operating elements of the motor vehicle 2 not shown here in detail, which are connected with the handsfree device 5 by way of the data bus 1. In addition, the handsfree device 5 allows for recording sound signals by way of the microphone 9 and their transmission to an authorized external device.

The coupling module 6 of the handsfree device 5, in principle, is suitable for coupling external devices for the purpose of data communication with one or more users of the data bus, for example, for implementing the above-mentioned partial functionalities. However, the coupling requires an authorization of the respective external device by the coupling module 6. In the present embodiment, the coupling module 6 therefore operates on the motor vehicle side as an authorization device in accordance with the invention. According to alternative embodiments of the invention, which are not described here in detail, an independent authorization device or an authorization device coupled with other functions may also be provided.

In the present embodiment, at least when the ignition of the motor vehicle 2 is switched on, the coupling module 6 is always ready for the coupling-on or authorization of external devices ready to be coupled.

For the successful authorization of an external device 3, the latter has to send a first code, together with a device identification, to the coupling module 6. The coupling module 6 checks whether this first code corresponds to a second code stored in the code memory 7. If the two codes corresponding to one another, the external device 3 will be authorized to be coupled to the data bus 1 and to carry out the above-mentioned partial functionalities of the handsfree functionality.

As a basis for comparison, a time-variable second code is stored in the code memory 7 of the coupling module 6. This second code is determined by the coupling module 6 in that the latter, by way of the data bus 1, reads out the mileage of the motor vehicle 2 from the storage unit 10 and stores its last four digits as a second code in the code memory 7. The updating of the code memory 7 can take place in a time-controlled manner, for example, at regular intervals, or in an event-controlled manner, for example, after the receipt of an authorization request by an external device.

The authorization of an external device 3 for the coupling to a data bus 1 can take place by using the described systems as follows.

First, the external device 3 is connected with the coupling module 6 by the operator. In the present embodiment, this connection takes place on the basis of Bluetooth network technology. For this purpose, the external device is brought into a range of a few meters of the antenna, preferably into the motor vehicle interior.

Next, the external device 3 automatically detects the coupling readiness of the coupling module 6 and prompts the operator to enter a first code. As required, the information is added to the prompt that the first code required for a successful authorization results from the last four digits of the current mileage of the motor vehicle. After entering the first code by the operator, this first code, together with a device identification, is sent from the external device 3 to the coupling module 6. The coupling module 6 compares the first code with the second code stored in its code memory 7 and, if the two codes correspond to one another, authorizes the external device 3 for above-mentioned partial functionalities of the handsfree functionality.

For the authorization of the external device 3, the operator only has to read out the last four digits of the mileage from the display unit 12 and to enter them into the external device 3.

No operating action by the operator is required for the output of the mileage. In addition, the mileage is indicated by the display unit 12 independently of the authorization of the external device for informing the driver. To this extent, no dedicated display unit has to be provided for implementing the described authorization method.

If the external device is not suitable for the automatic detection of a coupling module 6 ready for coupling and situated in its range, it may be necessary to change the external device 3 in a manner known per se to a special operating mode for detecting devices ready to be coupled.

For reasons of clarity, a code memory 7 and a holding of the stored second code are provided at the coupling module 6 in the present embodiment. As an alternative, the second code can be determined during an authorization operation, for example, after receipt of an authorization request from an external device, and can be compared with a first code sent by the external device.

Within the scope of the above description, the possibility of encrypting codes, for example, during their storage and transmission, was not discussed in an attempt to provide a comprehensible description. However, if such encryption takes place in a manner known per se, the idea according to the invention may include such an encryption. The encryption may relate to the first code, the second code, or to both codes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of authorizing an external device optionally connectable with a data bus of a motor vehicle, the method comprising the acts of:

receiving in an authorization device of the motor vehicle via the data bus at least a first code enterable by an operator into the external device connectable to the data bus;

comparing the first code with a second code by the authorization device and, if the first code corresponds to the second code, authorizing the external device to couple to the data bus;

wherein the second code is defined in a time-variable manner by the motor vehicle independently of the external device after the motor vehicle receives a request for data bus access and is determinable from code information visually output in an interior of the motor vehicle by an output unit of the motor vehicle, and the first code is derived from the code information output in the vehicle interior.

2. The method according to claim 1, wherein the second code is defined by the authorization device.

3. The method according to claim 1, wherein the second code is determined from an operating quantity stored in the motor vehicle.

4. The method according to claim 1, wherein the second code is determined from an operating quantity stored in the motor vehicle.

5. The method according to claim 3, wherein the second code is determined from an operating quantity stored in the vehicle, which is output as the code information by the output unit of the motor vehicle for at least one purpose independent of authorizing the external device.

6. The method according to claim 4, wherein the second code is determined from an operating quantity stored in the vehicle, which is output as the code information by the output unit of the motor vehicle for at least one purpose independent of authorizing the external device.

7. The method according to claim 1, wherein the code information is emitted without any required operating action by the operator.

8. The method according to claim 1, wherein the code information is a mileage of the motor vehicle from which the second code is determined.

9. A method of authorizing an external device optionally connectable with a data bus of a motor vehicle by a comparison of a first code forwarded by the external device to an authorization device of the motor vehicle via the data bus with a second code, the method comprising the acts of:

defining the second code, using the authorization device, in a time-variable manner in the motor vehicle independently of the external device after the motor vehicle receives a request for data bus access;

outputting visually coded information suitable for determining the second code in an interior of the motor vehicle by an output unit, and deriving the first code from the coded information.

10. The method according to claim 9, wherein the second code is determined from an operating quantity stored in the motor vehicle.

11. The method according to claim 10, wherein the coded information from which the second code is determined is the operating quantity stored in the motor vehicle and output in the motor vehicle for at least one purpose independent of supplying the coded information.

12. The method according to claim 11, wherein the second code is determined from mileage of the motor vehicle.

13. The method according to claim 9, further comprising the acts of:

determining the second code from the coded information; and inputting the second code as the first code into the external device for authorizing its coupling with the data bus of the motor vehicle.

* * * * *